(12) United States Patent
Flachs et al.

(10) Patent No.: US 8,381,006 B2
(45) Date of Patent: Feb. 19, 2013

(54) REDUCING POWER REQUIREMENTS OF A MULTIPLE CORE PROCESSOR

(75) Inventors: Brian K. Flachs, Georgetown, TX (US); Gilles Gervais, Austin, TX (US); Sang H. Dhong, San Jose, CA (US); Tetsuji Tamura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/756,570

(22) Filed: Apr. 8, 2010

(65) Prior Publication Data

US 2011/0252260 A1 Oct. 13, 2011

(51) Int. Cl.
*G06F 1/00* (2006.01)
(52) U.S. Cl. .................................... 713/324; 718/105
(58) Field of Classification Search .................. 713/324; 718/105
See application file for complete search history.

(56) References Cited

U.S. PATENT DOCUMENTS

| | | | |
|---|---|---|---|
| 6,691,216 B2 | 2/2004 | Kelly et al. | |
| 6,785,841 B2 * | 8/2004 | Akrout et al. | 714/11 |
| 6,895,479 B2 | 5/2005 | Reimer et al. | |
| 6,901,522 B2 * | 5/2005 | Buch | 713/320 |
| 7,124,318 B2 | 10/2006 | Luick | |
| 7,318,164 B2 * | 1/2008 | Rawson, III | 713/320 |
| 7,328,371 B1 * | 2/2008 | Kalyanasundharam et al. | 714/11 |

OTHER PUBLICATIONS

Jones, Alex K. et al., "Reducing Power while Increasing Performance with SuperCISC", ACM Transactions on Embedded Computing Systems, vol. 5, No. 3, Aug. 2006, pp. 658-686.
Petrov, Peter et al., "Power Efficiency through Application-Specific Instruction Memory Transformations", IEEE, Proceedings of the Design, Automation and Test in Europe Conference and Exhibition, 2003, 6 pages.
Soundararajan, Niranjan et al., "Mechanisms for Bounding Vulnerabilities of Processor Structures", ACM, 2007, ISCA '07, Jun. 9-13, 2007, pp. 506-515.

* cited by examiner

*Primary Examiner* — Chun Cao
(74) *Attorney, Agent, or Firm* — Francis Lammes; Stephen J. Walder, Jr.; Matthew B. Talpis

(57) ABSTRACT

A mechanism is provided for reducing power consumed by a multi-core processor. Responsive to a number of properly functioning processor cores being more than a required number of processor cores in a multi-core processor, the power consumption measurement module determines a number of the properly functioning processor cores to disable. The power consumption measurement module initiates an equal amount of workload to be processed by each of the properly functioning processor cores. The power consumption measurement module determines power consumed by each of the properly functioning processor cores. The power consumption measurement module deactivates one or more of the properly functioning processor cores that have maximum power in order that the number of properly functioning processor cores deactivated is equal to the number of properly functioning processor cores to disable.

20 Claims, 5 Drawing Sheets

REDUCING POWER REQUIREMENTS OF A MULTIPLE CORE PROCESSOR

BACKGROUND

The present application relates generally to an improved data processing apparatus and method and more specifically to mechanisms for reducing power requirements for a multiple core processor.

A multiple core processor combines two or more independent cores into a single package composed of a single integrated circuit (IC), called a die, or more dies packaged together. For example, a dual-core processor contains two cores, and a quad-core processor contains four cores. A multiple core microprocessor implements multiprocessing in a single physical package. The cores also share the same interconnect to the rest of the system. A system with n cores is effective when it is presented with n or more threads concurrently. Multiple core technology is widely used in many technology areas, especially those of embedded processors, such as network processors and digital signal processors, and in graphical processing units.

The cores in a multiple core processor are typically integrated onto a single integrated circuit die (known as a chip multiprocessor or CMP), or they may be integrated onto multiple dies in a single chip package. With the use of multiple core processors becoming more predominant, many multiple core processors feature redundant cores to compensate for primary processor cores that are initially defective and, thus, improve manufacturing yield of the multiple core processor.

SUMMARY

In one illustrative embodiment, a method, in a data processing system, is provided for reducing power consumed by a multi-core processor. The illustrative embodiment determines whether a number of properly functioning processor cores in the multi-core processor is more than the required number of processor cores for the multi-core processor. The illustrative embodiment determines a number of the properly functioning processor cores to disable in response to the number of properly functioning processor cores being more than the required number of processor cores. The illustrative embodiment initiates an equal amount of workload to be processed by each of the properly functioning processor cores. The illustrative embodiment determines power consumed by each of the properly functioning processor cores. The illustrative embodiment deactivates one or more of the properly functioning processor cores that have maximum power in order that the number of properly functioning processor cores deactivated is equal to the number of properly functioning processor cores to disable.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In known manufacturing and use of multiple core processors or multi-core processors, redundant cores are provided and used to compensate for initially defective cores. However, if all manufactured cores in a multi-core processor are functioning properly, a mechanism is needed to identify one or more of a set of properly functioning cores to deactivate in order to meet design specifications of the data processing system. The illustrative embodiments provide a mechanism for reducing power requirements of a multi-core processor by identifying which properly functioning cores to deactivate based on power consumption in order to meet design specifications and then deactivating one or more of those identified properly functioning cores.

Figure 1:
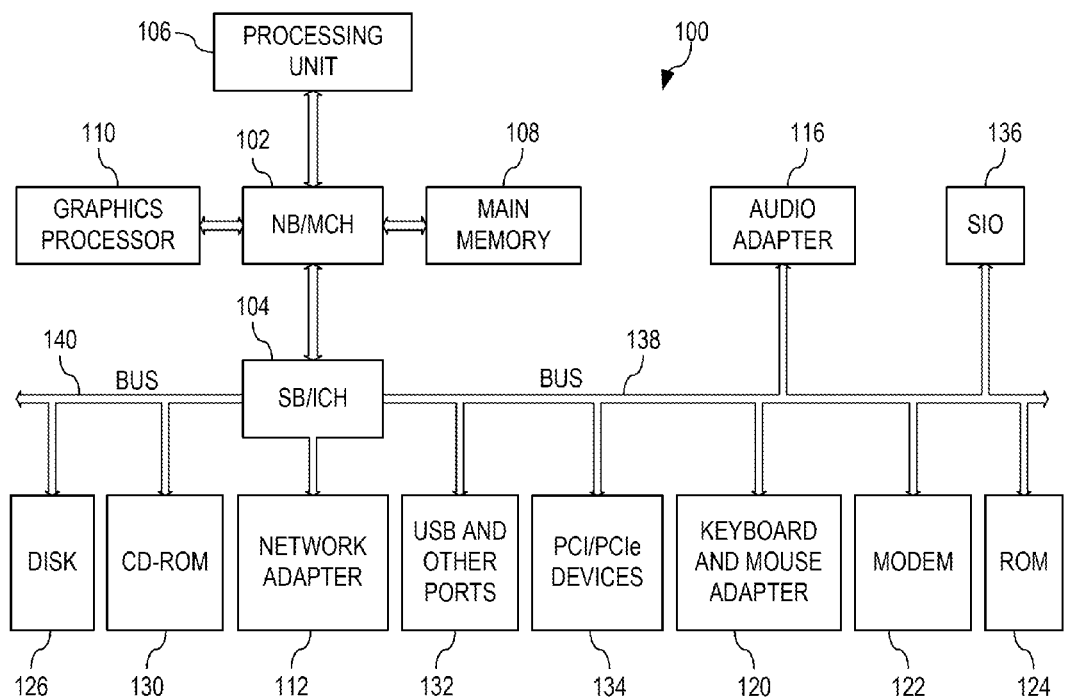
FIG. 1 depicts a block diagram of an example data processing system in which aspects of the illustrative embodiments may be implemented.
Figure 2:
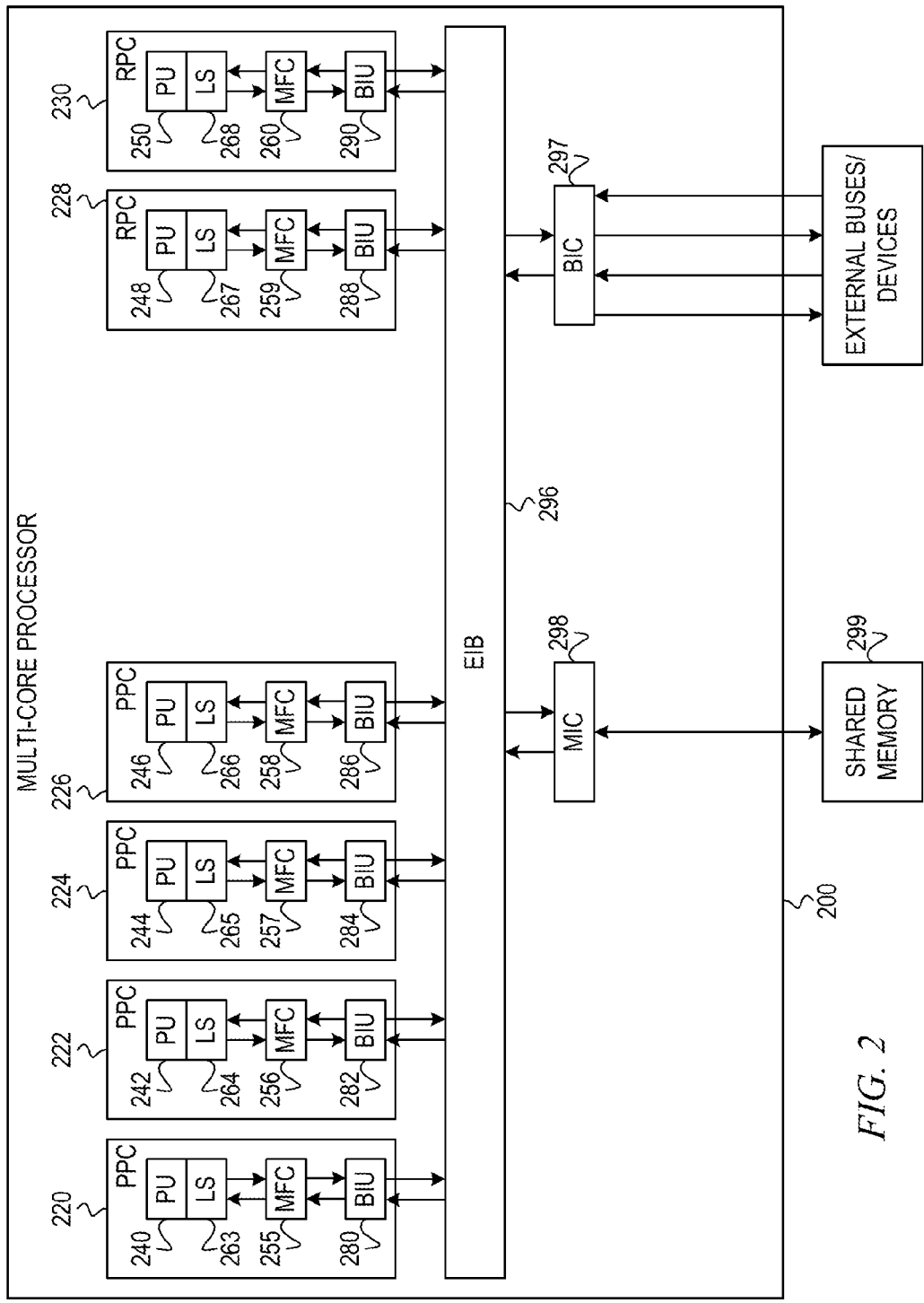
FIG. 2 is an exemplary block diagram of a data processing system in which aspects of the present invention may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism for reducing power requirements of a multi-core processor, this is only an example and is not intended to state or imply any limitation with regard to the features of the present invention. To the contrary, the illustrative embodiments are intended to include distributed data processing environments and embodiments in which power requirements of a multi-core processor may be reduced.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Moreover, data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

FIG. 2 is an exemplary block diagram of a data processing system in which aspects of the present invention may be implemented. The exemplary data processing system shown in FIG. 2 is an example of the multi-core processor data processing system. While the multi-core processor will be used in the description of the preferred embodiments of the present invention, the present invention is not limited to such, as will be readily apparent to those of ordinary skill in the art upon reading the following description.

As shown in FIG. 2, multi-core processor 200 includes multiple primary processor cores (PPCs) 220-226 and multiple redundant processor cores (RPCs) 228 and 230 that each has its own processor unit (PU) 240-250, memory flow control 255-260, local memory or store (LS) 263-268, and bus interface unit (BIU unit) 280-290 which may be, for example, a combination direct memory access (DMA), memory management unit (MMU), and bus interface unit. A high bandwidth internal element interconnect bus (EIB) 296, a bus interface controller (BIC) 297, and a memory interface controller (MIC) 298 are also provided.

The local memory or local store (LS) 263-268 is a non-coherent addressable portion of a large memory map which, physically, may be provided as small memories coupled to the PUs 240-250. The local stores 263-268 may be mapped to different address spaces. These address regions are continuous in a non-aliased configuration. Each local store 263-268 is associated with its corresponding PU 240-250 and PPCs 220-226 and RPCs 228 and 230 by its address location, such as via the PU Identification Register, described in greater detail hereafter. Any resource in the system has the ability to read/write from/to the local store 263-268 as long as the local store is not placed in a secure mode of operation, in which case only its associated PU may access the local store 263-268 or a designated secured portion of the local store 263-268.

Multi-core processor 200 may be a system-on-a-chip such that each of the elements depicted in FIG. 2 may be provided on a single microprocessor chip. Moreover, multi-core processor 200 is a heterogeneous processing environment in which each of the PUs may receive different instructions from each of the other PUs in the system. The PPCs 220-226 and RPCs 228 and 230 may be coupled to each other and to a L2 cache (not shown) via the EIB 296. In addition, the PPCs 220-226 and RPCs 228 and 230 may be coupled to MIC 298 and BIC 297 via the EIB 296. The MIC 298 provides a communication interface to shared memory 299. The BIC 297 provides a communication interface between the multiple core processor 200 and other external buses and devices.

The memory flow control units (MFCs) 255-260 serve as an interface for an PU to the rest of the system and other elements. The MFCs 255-260 provide the primary mechanism for data transfer, protection, and synchronization between main storage and the local storages 263-268. There is logically an MFC for each PU in a processor. Some implementations can share resources of a single MFC between multiple PUs. In such a case, all the facilities and commands defined for the MFC must appear independent to software for each PU. The effects of sharing an MFC are limited to implementation-dependent facilities and commands.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

This illustrative embodiments provide for identifying and deactivating one or more properly functioning cores in order to reduce power of a multi-core processor. By selecting one or more core(s) to be deactivated based on highest power consumption, the overall multi-core processor power consumption may be reduced. By deactivating selected core(s) with the highest power consumption, manufacturing yield may be improved as well as system costs may be reduced by reducing the system cooling costs and power supply costs while still meeting the overall design specification of the multi-core data processing system.

Figure 3:
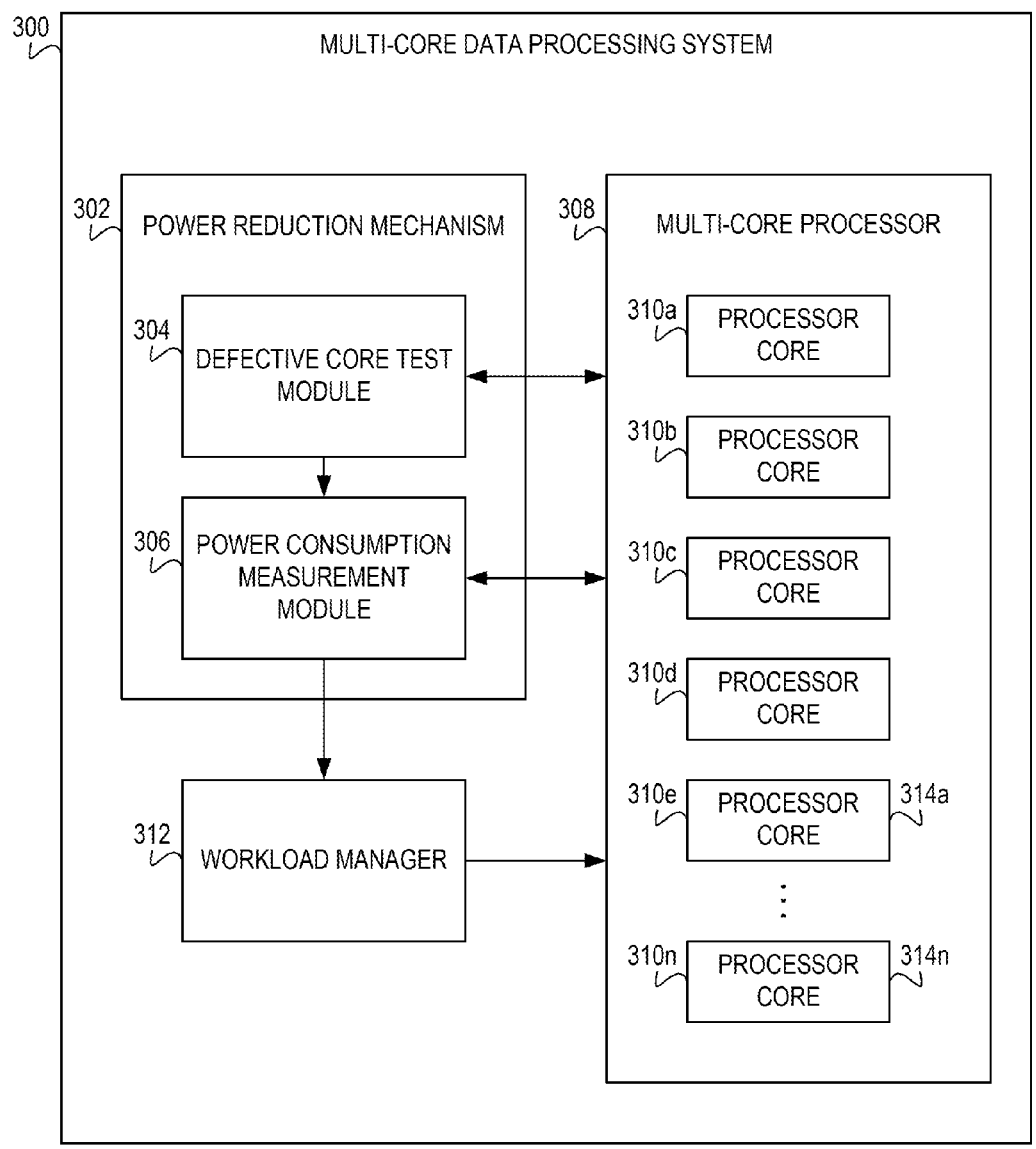
FIG. 3 depicts a block diagram for a power reduction mechanism for a multi-core processor in accordance with one illustrative embodiment.

FIG. 3 depicts a block diagram for a power reduction mechanism for a multi-core processor in accordance with one illustrative embodiment. Power reduction mechanism 302 within multi-core data processing system 300 comprises defective core test module 304 as well as power consumption measurement module 306. Multi-core processor 308 is initially manufactured with a set of processor cores that are intended for use by multi-core data processing system 300. Power reduction mechanism 302 either identifies based on preprogramming or detects the number of processor cores 310a-310n of multi-core processor 308. Once the number of processor cores 310a-310n are determined, defective core test module 304 runs manufacturing tests to determine whether any of processor cores 310a-310n are defective. If any of processor cores 310a-310n are defective, then defective core test module 304 deactivates the defective one or more of processor cores 310a-310n, using hardware, software, or a combination of hardware or software, such as via the use of an eFUSE, via chip input pins controlled by an external module, via scanning a configuration ring at startup, via external control of a power supply to the deactivated core, or the like. Defective core test module 304 then informs power consumption measurement module 306 of the deactivated processor cores, if any.

Power consumption measurement module 306 determines whether the number of defective processor cores reduces the number of processor cores in multi-core processor 308 such that there are fewer than the required number of processor cores to meet the design specifications of multi-core processor 308. That is, the design specification of multi-core processor 308 may indicate, for example, that four primary processor cores are required. If the number of defective processor cores is so high that there are not four properly operating processor cores, then multi-core processor is discarded. However, if, for example, power consumption measurement module 306 determines that there are enough processor cores to meet the design specifications, then power consumption measurement module 306 determines whether the number of properly functioning processor cores is equal to the required number of processor cores or more than the required number of processor cores.

If the number of properly functioning processor cores is equal to the required number of processor cores, then power consumption measurement module 306 does not run any power tests and power reduction mechanism 302 uses properly operating processor cores as the set of primary processor cores. However, if the number of properly functioning processor cores is more than the required number of processor cores, then power consumption measurement module 306 determines how many of properly operating processor cores 310a-310n to disable. Power consumption measurement module 306 determines the number of processor cores to disable by subtracting the number of properly operating cores from the required number of processor cores to meet the design specifications.

Once the number of processor cores to disable is determined, power consumption measurement module 306 performs power measurements of each of the properly functioning processor cores 310a-310n. Power measurements may comprise power supply current measurements with varying tests (including a maximum power irritator), operating conditions such as temperature, voltage, frequency, or the like, leakage testing, or the like. In order to perform the power measurements, power consumption measurement module 306 sends a request to workload manager 312 so that workload manager 312 sends an equal amount of work to each of the properly operating processor cores 310a-310n.

Power consumption measurement module 306 may determine power consumed by each of the properly operating processor cores 310a-310n by determining measured power, performance, frequency, or the like, at an input to each of properly operating processor cores 310a-310n. Once the requested workload has completed on each of properly operating processor cores 310a-310n, power consumption measurement module 306 determines which of properly operating processor cores 310a-310n have the highest power consumption. Power consumption measurement module 306 then disables, using hardware, software, or a combination of hardware or software, such as via the use of an eFUSE, via chip input pins controlled by an external module, via scanning a configuration ring at startup, via external control of a power supply to the deactivated core, or the like, the identified number of processor cores 310a-310n that are properly operating but have maximum power consumption forming a set of deactivated but not defective processor core(s) 314a-314n, which may also be referred to as redundant core(s). Thus, manufacturing yield may be improved as well as system costs may be reduced by reducing the system cooling costs and power supply costs while still meeting the overall design specification of multiple processor core data processing system 300.

In another illustrative embodiment, after multi-core data processing system 300 is being used by a user, the user may access power consumption measurement module 306 to determine the power consumption of operating processor cores 310a-310n as well any deactivated but not defective processor core(s) 314a-314n. That is, over time the operation of a processor core may change such that an operating processor core may now be consuming more power than a previously deactivated but not defective processor cores 314a-314n. Thus, power consumption measurement module 306 may perform power measurements as described above of each of the operating processor cores 310a-310n as well as any deactivated but not defective processor cores 314a-314n. In order to perform the power measurements, power consumption measurement module 306 may have to temporarily activate any deactivated but not defective processor core(s) 314a-314n.

Once the requested workload has completed on each of the operating processor cores 310a-310n as well as any deactivated but not defective processor cores 314a-314n, power consumption measurement module 306 determines which of operating processor cores 310a-310n as well as any deactivated but not defective processor cores 314a-314n has the highest power consumption. Power consumption measurement module 306 then disables the identified number of operating processor cores 310a-310n as well as any deactivated but not defective processor cores 314a-314n that are properly operating but have maximum power consumption. Thus, in this embodiment system costs may be reduced by reducing the system cooling costs and power supply costs of multi-core data processing system 300.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
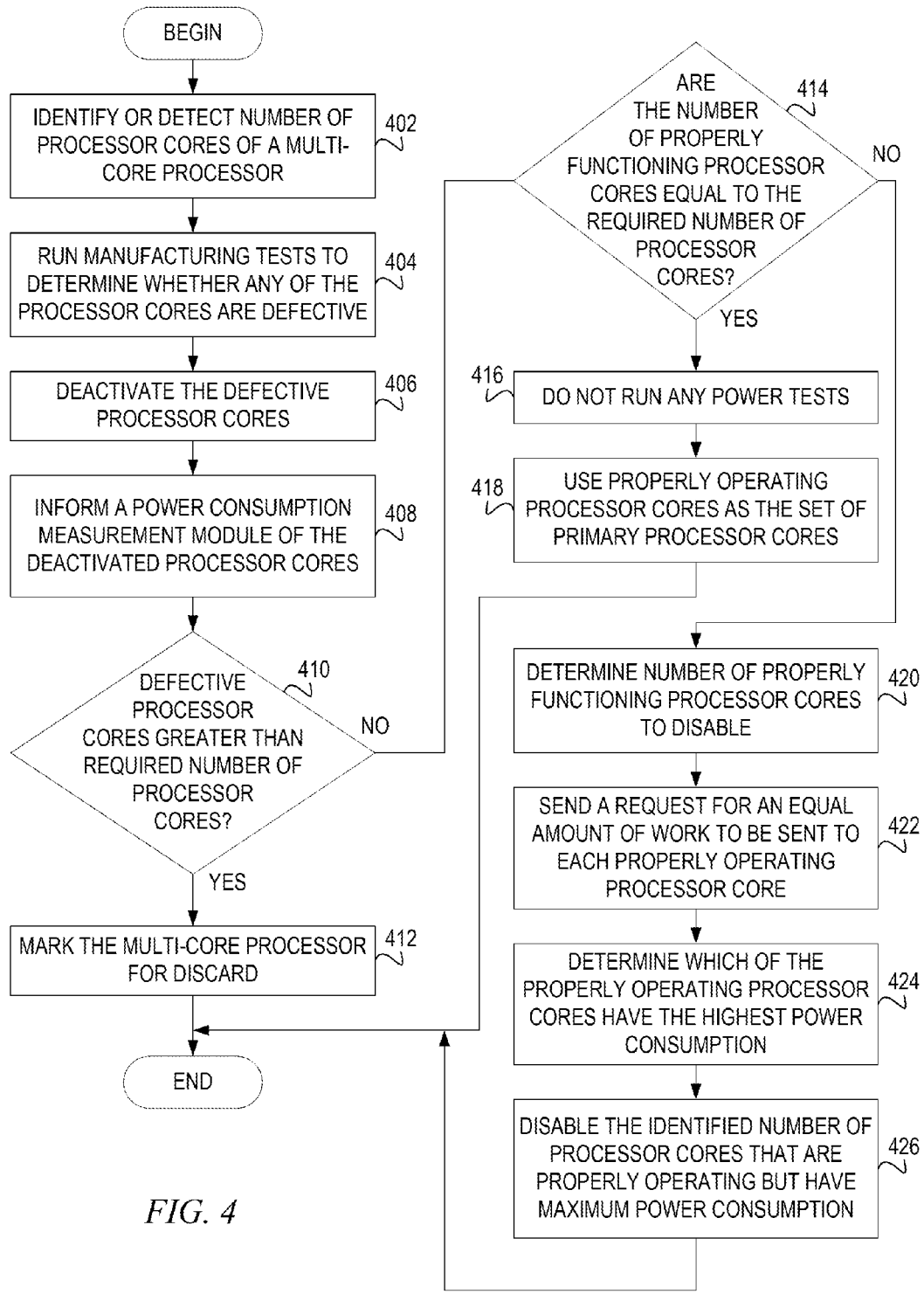
FIG. 4 provides a flowchart outlining example operations of a power reduction mechanism for a multi-core processor as used during manufacturing in accordance with an illustrative embodiment.
Figure 5:
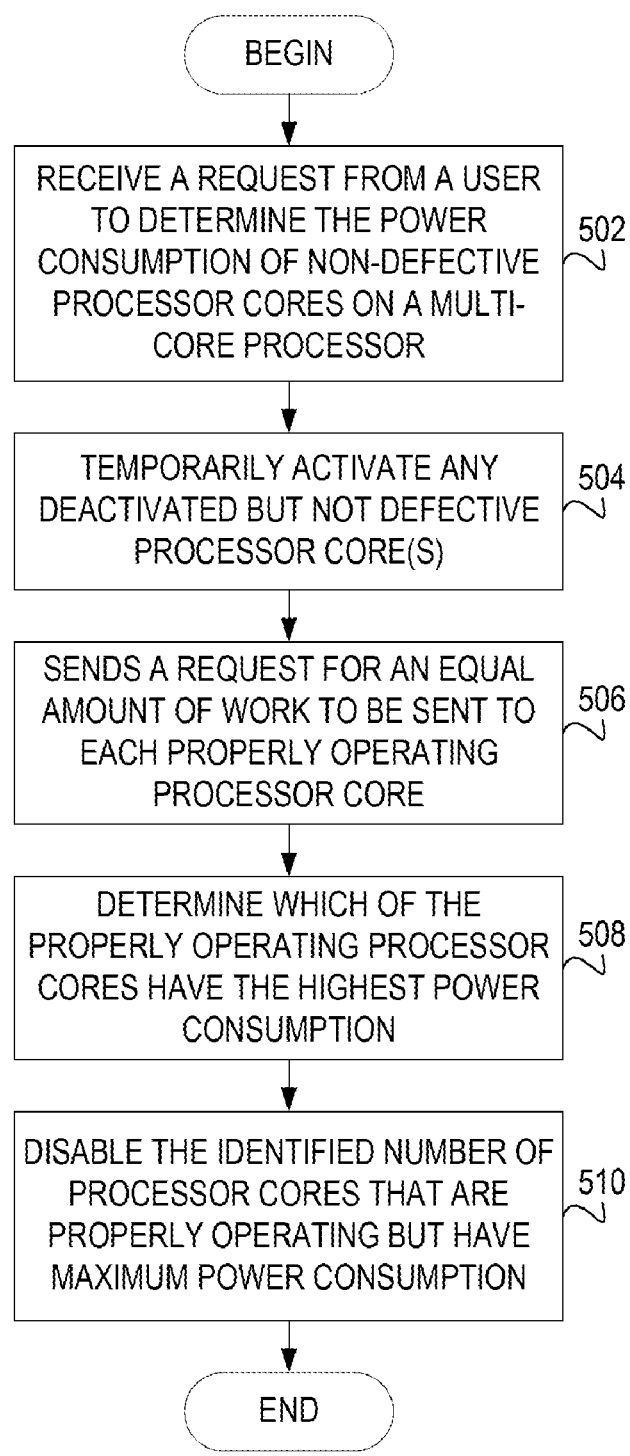
FIG. 5 provides a flowchart outlining example operations of a power reduction mechanism for a multi-core processor as used by a user in accordance with an illustrative embodiment.

Referring now to FIGS. 4-5, these figures provide flowcharts outlining example operations of a power reduction mechanism for a multi-core processor in accordance with one illustrative embodiment.

FIG. 4 provides a flowchart outlining example operations of a power reduction mechanism for a multi-core processor as used during manufacturing in accordance with an illustrative embodiment. As the operation begins, a power reduction mechanism either identifies based on preprogramming or detects the number of processor cores of a multi-core processor (step 402). Once the number of processor cores are determined, a defective core test module runs manufacturing tests to determine whether any of the processor cores are defective (step 404). If any of the processor cores are defective, then the defective core test module deactivates the defective processor cores, using hardware, software, or a combination of hardware or software, such as via the use of an eFUSE, via chip input pins controlled by an external module, via scanning a configuration ring at startup, via external control of a power supply to the deactivated core, or the like (step 406). The defective core tests module then informs a power consumption measurement module of the deactivated processor cores, if any (step 408).

The power consumption measurement module determines whether the number of defective processor cores reduces the number of processor cores in the multi-core processor such that there are fewer than the required number of processor cores to meet the design specifications of the multi-core processor (step 410). If at step 410 the number of defective processor cores is so high that there are not four properly operating processor cores, the power consumption measurement module marks the multi-core processor for discard (step 412), with the operation terminating thereafter. If at step 410 there are enough processor cores to meet the design specifications, then the power consumption measurement module determines whether the number of properly functioning processor cores is equal to the required number of processor cores or more than the required number of processor cores (step 414).

If at step 414 the number of properly functioning processor cores is equal to the required number of processor cores, then the power consumption measurement module does not run any power tests (step 416). Then the power reduction mechanism uses properly operating processor cores as the set of primary processor cores (step 418) and the operation terminates. If at step 414 the number of properly functioning processor cores is more than the required number of processor cores, then the power consumption measurement module determines how many of the properly functioning processor cores to disable by subtracting the number of properly operating cores from the required number of processor cores to meet the design specifications (step 420).

Once the number of processor cores to disable is determined, the power consumption measurement module sends a request to a workload manager for an equal amount of work to be sent to each of the properly operating processor cores (step 422). The power consumption measurement module may determine power consumed by each of the properly operating processor cores by determining measured power, performance, frequency, or the like, at an input to each of the properly operating processor cores. Once the requested workload has completed on each of the properly operating processor cores, the power consumption measurement module determines which of the properly operating processor cores have the highest power consumption (step 424). The power consumption measurement module then disables, using hardware, software, or a combination of hardware or software, such as via the use of an eFUSE, via chip input pins controlled by an external module, via scanning a configuration ring at startup, via external control of a power supply to the deactivated core, or the like, the identified number of processor cores that are properly operating but have maximum power consumption (step 426) forming a set of deactivated but not defective processor core(s), which may also be referred to as redundant core(s), with the operation ending thereafter.

FIG. 5 provides a flowchart outlining example operations of a power reduction mechanism for a multi-core processor as used by a user in accordance with an illustrative embodiment. As the operation begins, the power consumption measurement module receives a request from a user to determine the power consumption of non-defective processor cores in a multi-core processor (step 502). The power consumption measurement module temporarily activates any deactivated but not defective processor core(s) (step 504). The power consumption measurement module sends a request to a workload manager for an equal amount of work to be sent to each of the properly operating processor cores (step 506). The power consumption measurement module may determine power consumed by each of the properly operating processor cores by determining measured power, performance, frequency, or the like, at an input to each of the properly operating processor cores. Once the requested workload has completed on each of the properly operating processor cores, the power consumption measurement module determines which of the properly operating processor cores have the highest power consumption (step 508). The power consumption measurement module then disables, using hardware, software, or a combination of hardware or software, such as via the use of an eFUSE, via chip input pins controlled by an external module, via scanning a configuration ring at startup, via external control of a power supply to the deactivated core, or the like, the identified number of processor cores that are properly operating but have maximum power consumption (step 510) forming a set of deactivated but not defective processor core(s), which may also be referred to as redundant core(s), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for reducing power of a multi-core processor. By selecting one or more core(s) to be deactivated based on highest power consumption, the overall multi-core processor power consumption may be reduced. By deactivating selected core(s) with the highest power consumption, manufacturing yield may be improved as well as system costs may be reduced by reducing the system cooling costs and power supply costs while still meeting the overall design specification of the multi-core data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reducing power consumed by a multi-core processor, the method comprising:
    determining, by a power consumption measurement module, whether a number of properly functioning processor cores in the multi-core processor is more than a required number of processor cores for the multi-core processor;
    responsive to the number of properly functioning processor cores being more than the required number of processor cores, determining, by the power consumption measurement module, a number of the properly functioning processor cores to disable;
    initiating, by the power consumption measurement module, an equal amount of workload to be processed by each of the properly functioning processor cores;
    determining, by the power consumption measurement module, power consumed by each of the properly functioning processor cores; and
    deactivating, by the power consumption measurement module, one or more of the properly functioning processor cores that have maximum power in order that the number of properly functioning processor cores deactivated is equal to the number of properly functioning processor cores to disable.

2. The method of claim 1, wherein the number of properly functioning processor cores to disable is determined by subtracting the number of properly operating cores from the required number of processor cores.

3. The method of claim 1, wherein the one or more of the properly functioning processor cores that have maximum power that are deactivated form a set of deactivated but not defective processor cores and wherein the remaining properly functioning processor cores form a set of operating cores.

4. The method of claim 3, further comprising:
    receiving, by the power consumption measurement module, a request from a user to determine the power consumption of non-detetive processor cores in the multi-core processor;
    responsive to receiving the request, temporarily activating, by the power consumption measurement module, the set of deactivated but not defective processor cores;
    initiating, by the power consumption measurement module, another equal amount of workload to be processed by each of the properly functioning processor cores;
    determining, by the power consumption measurement module, power consumed by each of the properly functioning processor cores; and
    deactivating, by the power consumption measurement module, one or more of the properly functioning processor cores that have maximum power in order that the number of properly functioning processor cores deactivated is equal to the number of properly functioning processor cores to disable thereby forming a new set of operating cores and a new set of deactivated but not defective processor cores.

5. The method of claim 1, wherein the one or more of the properly functioning processor cores that have maximum power are deactivated using at least one of hardware, software, or a combination of hardware and software.

6. The method of claim 1, wherein the properly functioning processor cores form a subset of the processor cores in the multi-core processor and wherein the remaining processor cores are defective processor cores.

7. The method of claim 6, wherein the defective processor cores are identified by the method comprising:
    performing, by a defective core test module, manufacturing tests on a plurality of processor cores in the multi-core processor;
    determining, by the defective core test module, whether any of the plurality of processor cores are defective; and
    responsive to determining that one or more processor cores of the plurality of processor cores are defective, deactivating, by the defective core test module, the one or more processor cores.

8. The method of claim 7, further comprising:
    sending, by the defective core test module, an indication of a number of defective processor cores to the power consumption measurement module.

9. A computer program product comprising a non-transitory computer readable storage medium having a computer readable program stored therein, wherein the computer readable program, when executed on a computing device, causes the computing device to:
    determine whether a number of properly functioning processor cores in the multi-core processor is more than a required number of processor cores for the multi-core processor;
    responsive to the number of properly functioning processor cores being more than the required number of processor cores, determine a number of the properly functioning processor cores to disable;

initiate an equal amount of workload to be processed by each of the properly functioning processor cores;

determine power consumed by each of the properly functioning processor cores; and deactivate one or more of the properly functioning processor cores that have maximum power in order that the number of properly functioning processor cores deactivated is equal to the number of properly functioning processor cores to disable.

10. The computer program product of claim 9, wherein the number of properly functioning processor cores to disable is determined by subtracting the number of properly operating cores from the required number of processor cores.

11. The computer program product of claim 9, wherein the one or more of the properly functioning processor cores that have maximum power that are deactivated form a set of deactivated but not defective processor cores and wherein the remaining properly functioning processor cores form a set of operating cores.

12. The computer program product of claim 11, wherein the computer readable program further causes the computing device to:

receive a request from a user to determine the power consumption of non-defective processor cores in the multi-core processor;

responsive to receiving the request, temporarily activate the set of deactivated but not defective processor cores;

initiate another equal amount of workload to be processed by each of the properly functioning processor cores;

determine power consumed by each of the properly functioning processor cores; and deactivate one or more of the properly functioning processor cores that have maximum power in order that the number of properly functioning processor cores deactivated is equal to the number of properly functioning processor cores to disable thereby forming a new set of operating cores and a new set of deactivated but not defective processor cores.

13. The computer program product of claim 9, wherein the one or more of the properly functioning processor cores that have maximum power are deactivated using at least one of hardware, software, or a combination of hardware and software.

14. The computer program product of claim 9, wherein the properly functioning processor cores form a subset of the processor cores in the multi-core processor and wherein the remaining processor cores are defective processor cores.

15. An apparatus, comprising:
a processor; and
a memory coupled to the processor, wherein the memory comprises instructions which, when executed by the processor, cause the processor to:

determine whether a number of properly functioning processor cores in the multi-core processor is more than a required number of processor cores for the multi-core processor;

responsive to the number of properly functioning processor cores being more than the required number of processor cores, determine a number of the properly functioning processor cores to disable;

initiate an equal amount of workload to be processed by each of the properly functioning processor cores;

determine power consumed by each of the properly functioning processor cores; and deactivate one or inure of the properly functioning processor cores that have maximum power in order that the number of properly functioning processor cores deactivated is equal to the number of properly functioning processor cores to disable.

16. The apparatus of claim 15, wherein the number of properly functioning processor cores to disable is determined by subtracting the number of properly operating cores from the required number of processor cores.

17. The apparatus of clam 15, wherein the one or more of the properly functioning processor cores that have maximum power that are deactivated form a set of deactivated but not defective processor cores and wherein the remaining properly functioning processor cores form a set of operating cores.

18. The apparatus of claim 15, wherein the computer readable program further causes the computing device to:

receive a request from a user to determine the power consumption of non-defective processor cores in the multi-core processor;

responsive to receiving the request, temporarily activate the set of deactivated but not defective processor cores;

initiate another equal amount of workload to be processed by each of the properly functioning processor cores;

determine power consumed by each of the properly functioning processor cores; and deactivate one or more of the properly functioning processor cores that have maximum power in order that the number of properly functioning processor cores deactivated is equal to the number of properly functioning processor cores to disable thereby forming a new set of operating cores and a new set of deactivated but not defective processor cores.

19. The apparatus of claim 15, wherein the one or more of the properly functioning processor cores that have maximum power are deactivated using at least one of hardware, software, or a combination of hardware and software.

20. The apparatus of claim 15, wherein the properly functioning processor cores form a subset of the processor cores in the multi-core processor and wherein the remaining processor cores are defective processor cores.

* * * * *